(12) United States Patent
Sarkar et al.

(10) Patent No.: US 8,442,319 B2
(45) Date of Patent: May 14, 2013

(54) SYSTEM AND METHOD FOR CLASSIFYING CONNECTED GROUPS OF FOREGROUND PIXELS IN SCANNED DOCUMENT IMAGES ACCORDING TO THE TYPE OF MARKING

(75) Inventors: Prateek Sarkar, Sunnyvale, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 896 days.

(21) Appl. No.: 12/501,187

(22) Filed: Jul. 10, 2009

(65) Prior Publication Data

US 2011/0007366 A1    Jan. 13, 2011

(51) Int. Cl.
*G06K 9/30*    (2006.01)

(52) U.S. Cl.
USPC ............ 382/180; 382/159; 382/164; 382/224

(58) Field of Classification Search ................... 382/170, 382/173, 175, 176, 177, 234, 164, 180, 224
See application file for complete search history.

(56) References Cited

U.S. PATENT DOCUMENTS

| | | | |
|---|---|---|---|
| 5,181,255 A | 1/1993 | Bloomberg | |
| 5,201,011 A | 4/1993 | Bloomberg et al. | |
| 5,202,933 A | 4/1993 | Bloomberg | |
| 5,369,714 A * | 11/1994 | Withgott et al. | 382/177 |
| 5,570,435 A | 10/1996 | Bloomberg et al. | |
| 5,778,092 A | 7/1998 | MacLeod et al. | |
| 5,892,842 A | 4/1999 | Bloomberg | |
| 5,956,468 A * | 9/1999 | Ancin | 358/1.9 |
| 6,009,196 A * | 12/1999 | Mahoney | 382/176 |
| 6,301,386 B1 | 10/2001 | Zhu et al. | |
| 6,377,710 B1 | 4/2002 | Saund | |
| 6,411,733 B1 | 6/2002 | Saund | |
| 6,587,583 B1 | 7/2003 | Kurzweil et al. | |
| 6,771,816 B1 | 8/2004 | Gaither | |
| 6,903,751 B2 | 6/2005 | Saund et al. | |
| 7,036,077 B2 | 4/2006 | Saund et al. | |
| 7,079,687 B2 * | 7/2006 | Guleryuz | 382/180 |
| 7,086,013 B2 | 8/2006 | Saund et al. | |
| 7,136,082 B2 | 11/2006 | Saund et al. | |
| 7,177,483 B2 | 2/2007 | Saund | |
| 7,379,594 B2 | 5/2008 | Ferman et al. | |
| 7,570,816 B2 * | 8/2009 | Bargeron et al. | 382/224 |
| 7,734,094 B2 | 6/2010 | Revow | |

(Continued)

OTHER PUBLICATIONS

Zheng et al., "Machine Printed Text and Handwriting Identification in Noisy Document Images", IEEE Trans. Pattern Anal. Mach. Intell., 26(3):337-353, 2004.

(Continued)

*Primary Examiner* — Gregory M Desire
(74) *Attorney, Agent, or Firm* — Fay Sharpe LLP

(57) ABSTRACT

Methods and systems for classifying markings on images in a document are undertaken according to marking types. The document containing the images is supplied to a segmenter which breaks the images into fragments of foreground pixel structures that are identified as being likely to be of the same marking type by finding connected components, extracting near-horizontal or -vertical rule lines and subdividing some connected components to obtain the fragments. The fragments are then supplied to a classifier, where the classifier provides a category score for each fragment, wherein the classifier is trained from the groundtruth images whose pixels are labeled according to known marking types. Thereafter, a same label is assigned to all pixels in a particular fragment, when the fragment is classified by the classifier.

19 Claims, 13 Drawing Sheets

U.S. PATENT DOCUMENTS

| | | | |
|---|---|---|---|
| 7,783,117 B2 | 8/2010 | Liu et al. | |
| 7,792,353 B2 * | 9/2010 | Forman et al. | 382/159 |
| 7,899,258 B2 * | 3/2011 | Liu et al. | 382/232 |
| 7,907,778 B2 * | 3/2011 | Xiao et al. | 382/180 |
| 7,936,923 B2 * | 5/2011 | Liu et al. | 382/173 |
| 7,958,068 B2 * | 6/2011 | Smith et al. | 706/20 |
| 7,970,171 B2 | 6/2011 | Lookingbill et al. | |
| 8,171,392 B2 * | 5/2012 | Bastos dos Santos et al. | 715/227 |
| 8,180,112 B2 | 5/2012 | Kurtz et al. | |
| 2006/0002623 A1 * | 1/2006 | Dolan et al. | 382/254 |
| 2007/0009153 A1 | 1/2007 | Gallafent et al. | |
| 2008/0267497 A1 * | 10/2008 | Fan | 382/173 |
| 2010/0040285 A1 * | 2/2010 | Csurka et al. | 382/170 |
| 2011/0007366 A1 * | 1/2011 | Sarkar et al. | 358/462 |
| 2011/0007964 A1 | 1/2011 | Saund et al. | |
| 2011/0007970 A1 | 1/2011 | Saund | |

OTHER PUBLICATIONS

Chen et al., "Image Objects and Multi-Scale Features for Annotation Detection", in Proceedings of Int'l Conf. on Pattern Recognition, Tampa Bay, FL, 2008.

Koyama et al., "Local-Spectrum-Based Distinction Between Handwritten and Machine-Printed Characters", in Proceedings of the 2008 IEEE Int'l Conf. on Image Processing, San Diego, CA, Oct. 2008.

Breuel, "Segmentation of Handprinted Letter Strings Using a Dynamic Programming Algorithm", in Proceedings of 6th Int'l Conf. on Document Analysis and Recognition, pp. 821-826, 2001.

Freund et al., "A Decision-Theoretic Generalization of ON-Line Learning and an Application to Boosting", in European Conf. on Computational Learning Theory, pp. 23-27, 1995.

Ha et al., "The Architecture of Trueviz: A Groundtruth/Metadata Editing and Visualizing Toolkit", Pattern Recognition, 36(3):811-825, 2003.

Yang et al., "Semi-Automatic Grountdruth Generation for Chart Image Recognition", DAS, pp. 324-335, 2006.

Saund et al., "Perceptually-Supported Image Editing of Text and Graphics", ACM UISTI, pp. 183-192, 2003.

Huang et al., "User-Assisted Ink-Bleed Correction for Handwritten Documents", Joint Conference on Digital Libraries, 2008.

OpenCV, Internet website http://opencv.willowgarage.com/wiki/, last edited Mar. 18, 2009.

Evans et al., "Computer Assisted Interactive Recognition (CAVIAR) Technology", IEEE Int'l Conf. Electro-Information Technology, 2005.

Roth et al., "Ground Truth Editor and Document Interface", Summit on Arabic and Chinese Handwriting, 2006.

An et al., "Iterated document content classification", in Int'l Conf. Doc. Analysis & Recognition, vol. 1, pp. 252-256, Los Alamitos, CA, 2007.

Fan, et al., "Classification of machine-printed and handwritten texts using character block layout variance.", Pattern Recognition, 31(9):1275-1284, 1998.

Liang, et al., "Document image restoration using binary morphological filters", in Proc. SPIE Conf. Document Recognition, pp. 274-285, 1996.

Ford, et al., "Ground truth data for document image analysis", Symposium on Document Image Understanding and Technology, 2003.

Gatos et al., "ICDAR2007 handwriting segmentation contest", ICDAR, pp. 1284-1288, 2007.

Guo et al., "Separating handwritten material from machine printed text using hidden Markov models", Proc. ICDAR, pp. 439-443, 2001.

Guyon et al., "Data sets for OCR and document image understanding research", Proc. SPIE—Document Recognition IV, 1997.

Houle et al., "Handwriting stroke extraction using a new xytc transform", Proc. ICDAR, pp. 91-95, 2001.

Kavallieratou et al., Handwritten text localization in skewed documents, ICIP, pp. 1102-1105, 2001.

Kavallieratou et al., "Machine-printed from handwritten text discrimination", IWFHR-9, pp. 312-316, 2004.

Kuhnke et al., "A system for machine-written and hand-written character distinction", ICDAR, pp. 811-814, 1995.

Li et al., A new algorithm for detecting text line in handwritten documents, IWFHR, pp. 35-40, 2006.

Manmatha et al., "A scale space approach for automatically segmenting words from historical handwritten documents", IEEE, TPAMI, 27(8):1212-1225, Aug. 2005.

Okun et al., "Automatic ground-truth generation for skew-tolerance evaluation of document layout analysis methods", ICPR, pp. 376-379, 2000.

Shafait et al., "Pixel-accurate representation and evaluation of page segmentation in document images", ICPR, pp. 872-875, 2006.

Shetty, et al., "Segmentation and labeling of documents using conditional random fields", Proc. SPIE, 6500, 2007.

Wenyin et al., "A protocol for performance evaluation of line detection algorithms", Machine Vision and Applications, 9:240-250, 1997.

Yacoub et al., "A ground truthing environment for complex documents", DAS, pp. 452-456, 2005.

Zi et al., "Document image ground truth generation from electronic text", ICPR, pp. 663,666, 2004.

Zotkins et al., "Gedi: Groundtruthing environment for document images", http://lampsrv01.umiacs.umd.edu/projdb/project.php?id-53.

Bal et al., "Interactive degraded document enhancement and ground truth generation", DAS, 2008.

Moll et al., "Truthing for pixel-accurate segmentation", DAS 2008, 2008.

Pal et al., "Machine-printed and handwritten text lines identification", Patt. Rec. Lett., 22(3-4):431, 2001.

Saund et al., PixLabeler: User Interface for Pixel-Level Labeliing of Elements in Document Images, Document Analysis and Recognition, 2009, pp. 646-650, ICDAR '09 10th Int'l Conf., Made Available Jul. 26, 2009.

* cited by examiner

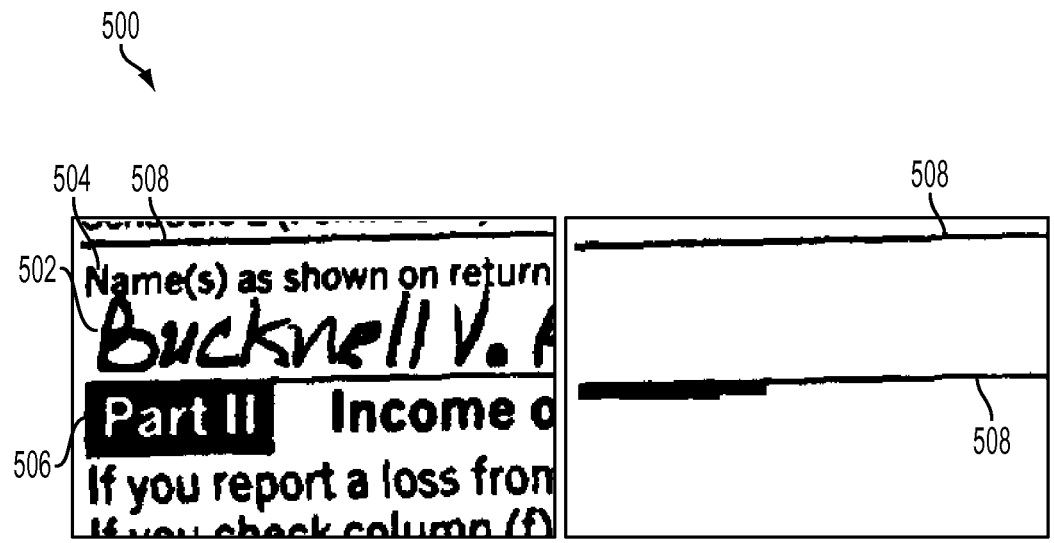
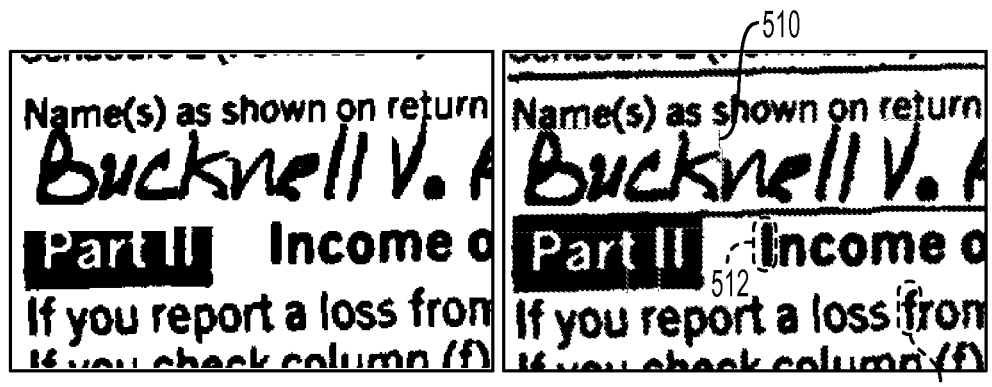
FIG. 5A  FIG. 5B
FIG. 5C  FIG. 5D

| TRUE LABEL ↓ | ASSIGNED LABELS | | | | | ERROR | RECALL (%) | TOTAL |
|---|---|---|---|---|---|---|---|---|
| | HWRITING | MPGRAPHIC | MPTEXT | NOISEDARK | NOISES&P | | | |
| HWRITING | 1197 | 60 | 49 | 39 | 52 | 200 | 85.70 | 1397 |
| MPGRAPHIC | 64 | 1025 | 140 | 161 | 20 | 386 | 72.64 | 1411 |
| MPTEXT | 238 | 145 | 13996 | 9 | 138 | 530 | 96.35 | 14525 |
| NOISEDARK | 110 | 91 | 31 | 2544 | 740 | 972 | 72.36 | 3516 |
| NOISES&P | 76 | 11 | 43 | 197 | 1298 | 326 | 79.93 | 1624 |
| UNKNOWN | 2 | 4 | 12 | 8 | 4 | 31 | . | 31 |
| ERROR | 489 | 311 | 275 | 415 | 954 | 2444 | . | . |
| PRECISION (%) | 70.96 | 76.74 | 98.07 | 85.98 | 57.62 | . | . | . |
| TOTAL | 1687 | 1335 | 14271 | 2959 | 2252 | . | . | 22504 |

SYSTEM AND METHOD FOR CLASSIFYING CONNECTED GROUPS OF FOREGROUND PIXELS IN SCANNED DOCUMENT IMAGES ACCORDING TO THE TYPE OF MARKING

CROSS REFERENCE TO RELATED PATENTS AND APPLICATIONS

Commonly assigned applications, U.S. Publication No. 2011-0007970A1, to Saund, entitled, "System And Method For Segmenting Text Lines In Documents"; and U.S. Publication No. 2011-0007964A1, to Saund et al., entitled, "System and Method for Machine-Assisted Human Labeling of Pixels in an Image", are each incorporated herein by reference in their entirety.

BACKGROUND

The present application is directed to document image analysis, and more particularly to automated differentiation between different types of markings found on documents.

An automated electronic based system having the capability for such detection has uses in a number of environments. For example, in legal document discovery it is valuable for lawyers to be able to quickly narrow down, from millions of pages, those pages which have been marked on. Also, in automated data extraction, absence of handwritten marks in a signature box can be translated to mean the absence of a signature. Further, being able to tell noise marks apart from machine printed marks can lead to better segmentation for optical character recognition (OCR). It is therefore envisioned one area the present system will find use is in the context of forms, where printed or handwritten text may overlap machine printed rules and lines.

Identifying granular noise (sometimes called salt and pepper noise), line graphics, and machine print text have received the most attention in document image analysis literature. The dominant approaches have relied on certain predictable characteristics of each of these kinds of markings. For example, connected components of pixels that are smaller than a certain size are assumed to be noise; large regions of dark pixels are assumed to be shadows; and long straight runs of pixels are assumed to come from line graphics. Identification of machine print text is an even more difficult task. In commercial OCR packages, systems for the detection of machine printed regions have been heavily hand-tuned, especially for Romanic scripts, in order to work in known contexts of language, script, image resolution and text size. While these processes have had certain success when used with clean images, they have not been successful when dealing with images having clutter.

Zheng et al., "Machine Printed Text And Handwriting Identification In Noisy Document Images," *IEEE Trans. Pattern anal. Mach. Intell.*, 26(3):337-353, 2004, emphasized classifying regions of pixels (roughly text words) into one of the following categories: machine print text, handwritten text, noise. Zheng et al. employed a large number of features, selected according to discriminative ability for classification. The results are post processed using a Markov Random Field that enforces neighborhood relationships of text words.

Chen et al., "Image Objects And Multi-Scale Features For Annotation Detection", in *Proceedings of International Conference on Pattern Recognition*, Tampa Bay, Fla., 2008, focused on the selecting the right level of segmentation through a multiscale hierarchical segmentation scheme.

Koyama et al., "Local-Spectrum-Based Distinction Between Handwritten And Machine-Printed Characters", in *Proceedings of the* 2008 *IEEE International Conference On Image Processing*, San Diego, Calif., October 2008, used local texture features to classify small regions of an image into machine-printed or handwritten.

SUMMARY

Methods and systems for classifying markings on images in a document are undertaken according to marking types. The document containing the images is supplied to a segmenter which breaks the images into fragments of foreground pixel structures that are identified as being likely to be of the same marking type by finding connected components, extracting near-horizontal or -vertical rule lines and subdividing some connected components to obtain the fragments. The fragments are then supplied to a classifier, where the classifier provides a category score for each fragment, wherein the classifier is trained from the groundtruth images whose pixels are labeled according to known marking types. Thereafter, a same label is assigned to all pixels in a particular fragment, when the fragment is classified by the classifier.

BRIEF DESCRIPTION OF THE DRAWINGS

FIGS. 5A-5D illustrate various aspects of an image undergoing segmentation of the present application;

DETAILED DESCRIPTION

Figure 1:
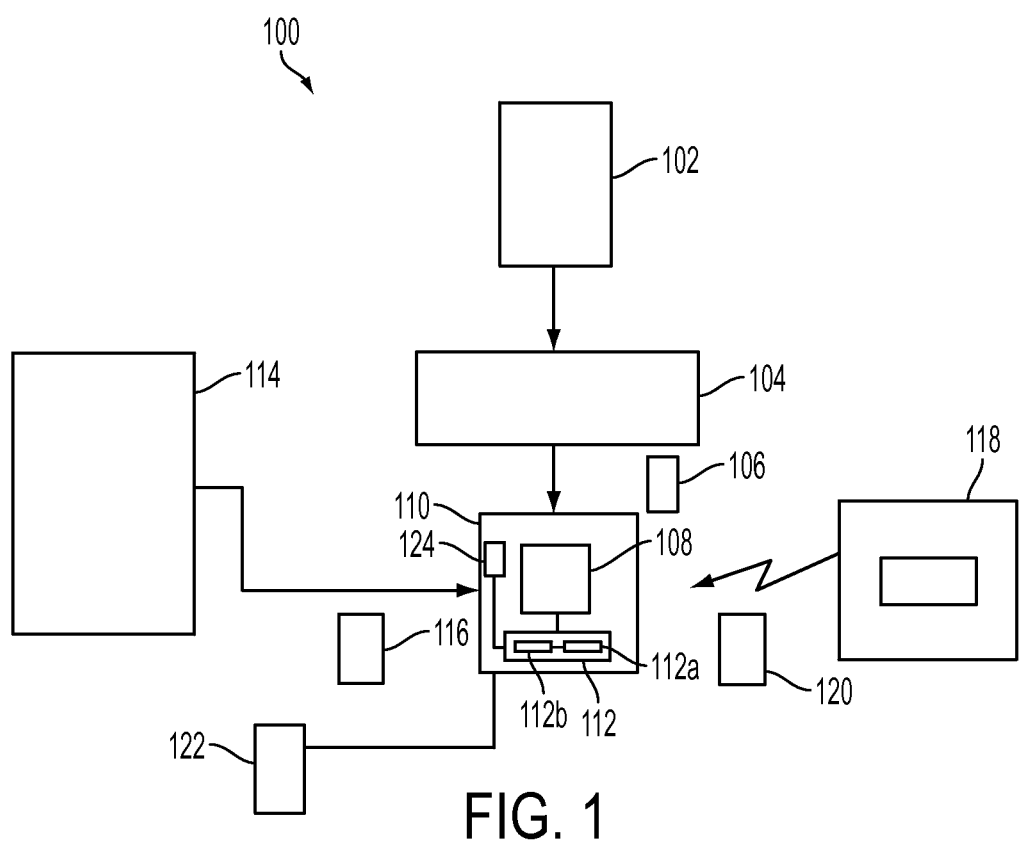
FIG. 1 is a system in which the concepts of the present application may be implemented.

Described are methods and systems designed to identify various kinds of markings in binary images of documents. The identification is then used to detect handwriting, machine print and noise in the document images. The methods and systems of the present disclosure are trainable based on examples. In some embodiments the systems are configured to input and transform a physical hardcopy document into a binary image and to output a new image version where image pixels are color coded according to the automatic classification of the type of marking the fragment belongs.

In one embodiment a hardcopy document is digitized with images, including at least one of handwritten text, machine printed text, machine printed graphics, unidentified markings (i.e., noise) and form lines or rules. The images are segmented into fragments by a segmenter module. Each fragment is classified by an automatically trained multi-stage classifier and classification labels are provided to the fragments. These labels may be colors, differing gray tones, symbols, or other identifiers. In order to arrive at the classification label, the classifier considers not just properties of the fragment itself, but also properties of the fragment neighborhood. In classification nomenclature these properties or attributes are called features. Features relevant for discrimination are picked out automatically from among a plurality of feature measurements. The classifier is a two-staged classifier trained from labeled example images where each pixel has a "groundtruth" label, i.e., the label on a base or original image. A held out set of groundtruth images can be used for evaluation. Thereafter, the labeled document is stored in memory, displayed in an electronic display, printed out or otherwise processed.

A particular aspect of the present methods and systems is the ability to automatically train parameters from examples or groundtruths. This enables the present concepts to be used in high-volume operations by targeting specific goals and data at hand.

The disclosed methods and systems address the comparatively difficult task of classifying small marking fragments at the connected component or sub-connected component level. The motivation is for at least two reasons. First this allows for calling out/identifying touching markings of different types, which permits appropriate splitting, when necessary, of the connected components. The second motivation is to build a useful basic building block (e.g., a fragment-classifier) with the understanding that coarser level decisions (at the level of words, regions, or pages) can be made with much higher accuracy by aggregating the output of the described basic building block tool (e.g., the fragment-classifier). In contradistinction, previous concepts target classification of larger aggregate regions only.

It is understood a single foreground (e.g., black) pixel alone does not have sufficient information to be used to decipher its source type (i.e., the type of mark it is). Following are examples of different types of markings on an image. It is to be understood the markings described below are provided to assist in the explanation of the present concepts and are not considered to be limiting of the present description or the claims of this application. Thus, the following assumptions are simply examples made to assist in providing a representation of groundtruth, and a consistent evaluation metric:

i. Pixel labels: Each pixel has a single marking category label. This assumption is purely pragmatic, of course. This allows the groundtruth of an image to be represented as another image with an integer label for each pixel. Thus a groundtruth can be stored and its output processed using known image formats, and image viewers, loaders, and editors may be used to efficiently visualize and manipulate them. This also leads to a simple, general, and consistent evaluation metric that is discussed later.
 ii. Background pixels: marking categories are assigned only to foreground pixels (e.g., black) and it is assumed that white pixels form the background (e.g., paper). This assumption matches current usage scenarios.
 iii. Ambiguous pixels: Clearly, multiple markings can overlap in a single black pixel. When both markings are of the same category, there is no ambiguity in pixel labeling. In other situations the pixel has to be assigned to one of the overlapping marking categories. A predefined order of priority will be assumed for the category labels. Any ambiguity can be resolved by assigning the label with higher priority. For example, in one implementation, "Handwritten Text" is the category with highest priority. When handwritten characters overlap machine printed lines, pixels in the intersection are labeled as "Handwritten Text". Noise labels have the lowest priority.
 iv. Evaluation metrics: When comparing two groundtruth label files, or an automatic classification output to groundtruth, the labels are compared at each pixel location and one error will be counted if the two labels differ. This is useful as an evaluation metric because the definition works consistently irrespective of the solution approach. In one embodiment of this application, a segment-then-classify approach is used. An alternate approach classifies each pixel based on surrounding context. Yet another approach assigns labels to grid-patches of the image. Nevertheless, for all approaches, the present methods and systems measures the fraction of foreground pixels correctly labeled. Comparing pixel-labels leads to a confusion matrix, and other derivative metrics such as category-wise precision and recall, which will be discussed, for example, in connection with FIG. 9. The described concepts classify (and learn to classify) fragments, not pixels. Nevertheless, it is useful to use the pixel error metric as wrongly classifying a large fragment is worse than making a mistake on a small fragment.
 v. Assumptions about image content: While the setup is quite general, and the present systems and methods apply to situations not in line with the foregoing, there are several assumptions that are made about the images that are used—either explicitly or implicitly. First, it is assumed the test/application scenarios are well represented in the training images. For example, an assumption is made the images represent everyday scanned document images, nearly upright, in binary, at roughly 300 dpi; and that machine printed text is horizontally laid out.

In implementations, such as a software program operated on a document editing device, the above assumptions are considered to hold. Nevertheless, it is considered the systems and methods of the present application will continue to work if they do not hold.

The present methods and systems have been designed to be fairly general and extensible, therefore the following target marking categories as defined below may be altered depending upon the particular implementation. However, for the present discussion the identification of the following target markings and their order of disambiguation priority (higher (i) to lower (v) are used:

i. Handwritten: This consists of HandwrittenText (handwritten paragraphs, words, single letters, or even just punctuation marks), HandwrittenSignatures, and HandwrittenGraphics (underlines, arrows, line markings, strikethroughs, check marks in check boxes). This text may be handprinted or cursive, and in any language or script. Cursive font printed text is considered MachinePrintText.
 ii. MachinePrintText: Black on white text that is machine printed in any language or script. Shaded text, or black background for white text should be marked as MachinePrintGraphic.
 iii. MachinePrintGraphic: MachinePrintLineGraphic (underlines, arrows, background rules, lineart), or MachinePrintBlockGraphic (bullets, logos, photos).
 iv. ScannerNoiseSaltPepper: Small granular noise usually due to paper texture, or faulty binarization.

v. ScannerNoiseDarkRegion: This is meant to cover significant black regions not generated by machine or handwriting ink. This includes black pixels generated by darkening of background-material, e.g. paper folds, shadows, holes, etc.

1. Solution Architecture

Depicted in FIG. 1 is a system 100 in which the concepts of the present application may be implemented. System 100 illustrates various channels by which digitized bitmapped images and/or images formed by digital ink techniques are provided to segmenter-classifier systems of the present application.

More particularly, a hardcopy of a document carrying images 102 is input to a scanner 104 which converts or transforms the images of document 102 into an electronic document of the images 106. While not being limited thereto, the images on hardcopy document 102 may be created by electronic data processing devices, by pens, pencils, or other non-electronic materials, or by stamps both electronic and manual. The electronic document 106 is displayed on a screen 108 of a computer, personal digital system or other electronic device 110, which includes a segmenter-classifier system 112 of the present application. The electronic device 108 includes at least one processor and sufficient electronic memory storage to operate the segmenter-classifier system 112, which in one embodiment is software. It is understood the depiction of electronic device 110 is intended to include inputs/outputs (I/O) including but not limited to a mouse, pen or stylus and/or keyboard.

Alternatively, a whiteboard or digital ink device 114 may be coupled to electronic device 110, whereby bitmapped or digital ink images 116 are electronically transmitted to device 110. Another channel by which bitmapped or digital ink images may be provided to the segmenter-classifier system 112, is through use of another electronic device 118. This device can be any of a number of systems, including but not limited to a computer, a computerized CAD system, an electronic tablet, personal digital assistant (PDA), a server on the Internet which delivers web pages, or any other system which provides bitmapped and/or digital ink images 120 to segmenter-classifier system 112. Further, image generation software, loaded on electronic device 110, can be used to generate a bitmapped or digital ink image for use by segmenter-classifier system 112. A finalized version of the electronic document with images processed by the segmenter-classifier system 112 is stored in the memory storage of the computer system 110, sent to another electronic device 118, printed out in hardcopy form by a printer 122 or printed out from printing capabilities associated with converter/scanner 104.

It is to be appreciated that while the foregoing discussion explicitly states a variety of channels to generate the images, concepts of the present application will also work with images on documents obtained through other channels as well.

With continuing attention to FIG. 1 segmenter-classifier system 112, includes segmenter 112a and classifier 112b. The segmenter 112a takes in a document image and partitions the set of pixels into small fragments. The classifier 112b then takes each fragment and assigns a category label to that fragment. The classifier 112b returns scores corresponding to different categories of markings, and in one embodiment the category with the best score. A downstream application such as an interpreter 124 may further interpret the scores in order to make decisions. For example, scores not satisfying an acceptance criteria may be labeled as "reject" or "unknown", or fragments that have handwriting scores above a preset threshold may be highlighted or marked for annotation processing on a processed electronic document displayed on display 108.

2. Segmenter

In the present application classifying or scoring each individual pixel according to its type of marking, particularly when pixels are either black or white, is accomplished by considering spatial neighborhoods and other forms of context of the document. Pixels may be classified based on feature measurements made on the neighborhood. This can lead to interesting possibilities especially enabling formulations where segmentation and recognition proceed in lock-step informing each other.

An approach of the present application is to fragment the images into chunks of pixels that can be assumed to come from the same source of markings. These fragments are then classified as a whole. Needless to say that since this segmenter 112a of the segmenter-classifier 112 will make hard decisions, any errors made by the segmenter are likely to cause errors in the end-result. Two kinds of errors are counted: (a) Creating fragments that are clearly a combination of different marking types, and (b) Unnecessarily carving out fragments from regions that are the same marking type.

While it is clear that errors of type (a) are bound to result in pixel-level labeling errors, the effect of type (b) errors are more subtle. Thus it is considered the more surrounding context that can be gathered, the better the results. It has been determined herein that identifying handwritten regions from machine printed regions is easier, than it is to tell handwritten characters from machine printed characters. It becomes even more difficult at the stroke level. Further problems arise when artificial boundaries introduced by the segmenter 112a mask the true appearance of a marking.

Despite the above concerns, a "segment-then-classify" approach has been adopted. The present approach acts to over-segment rather than under-segment by relying on connected component analysis, but with decision processing to split selected connected components when necessary.

Figure 2:
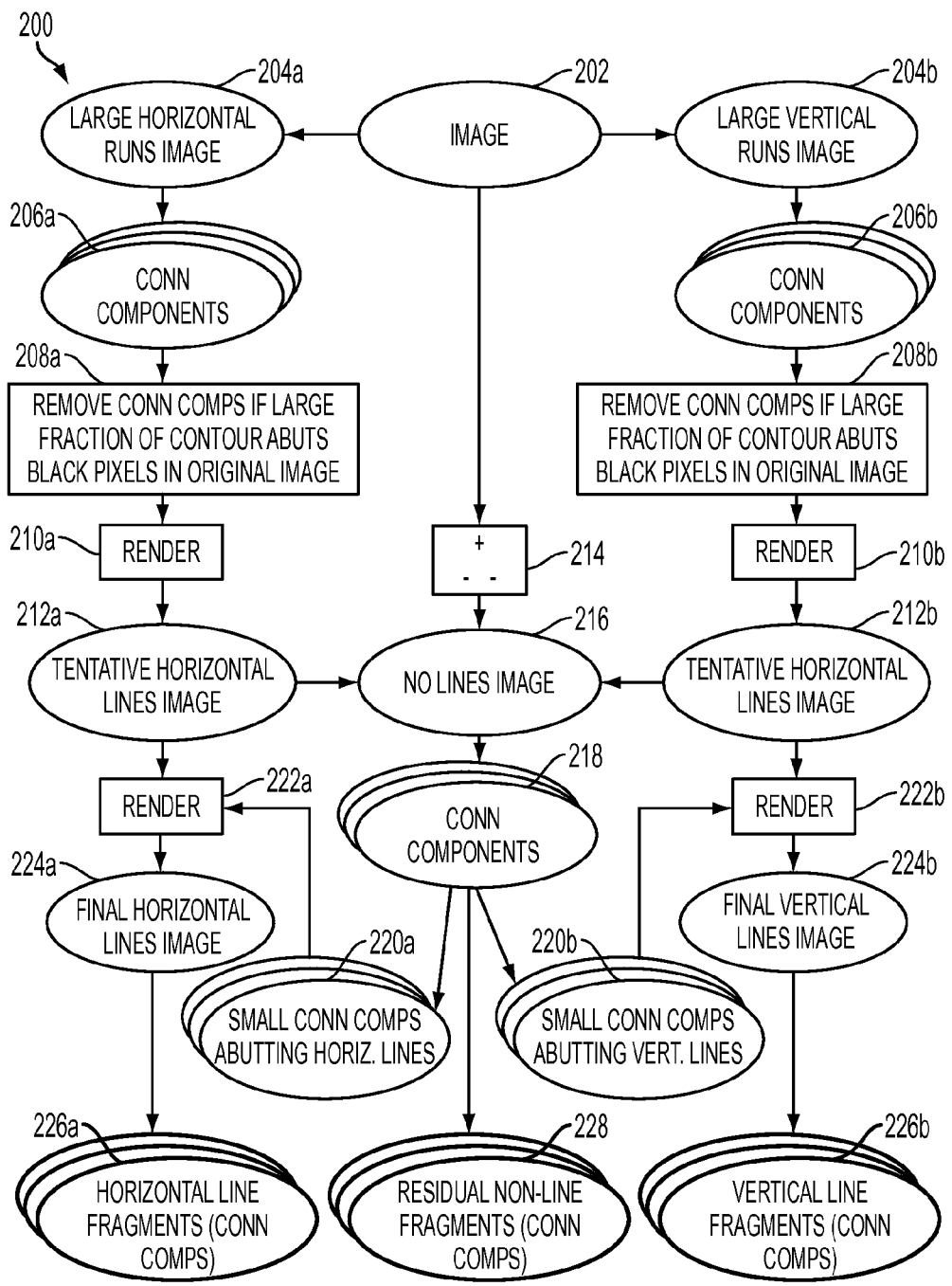
FIG. 2 is a flowchart for extracting long horizontal and vertical line fragments in a first stage of a segmenter.
Figure 3:
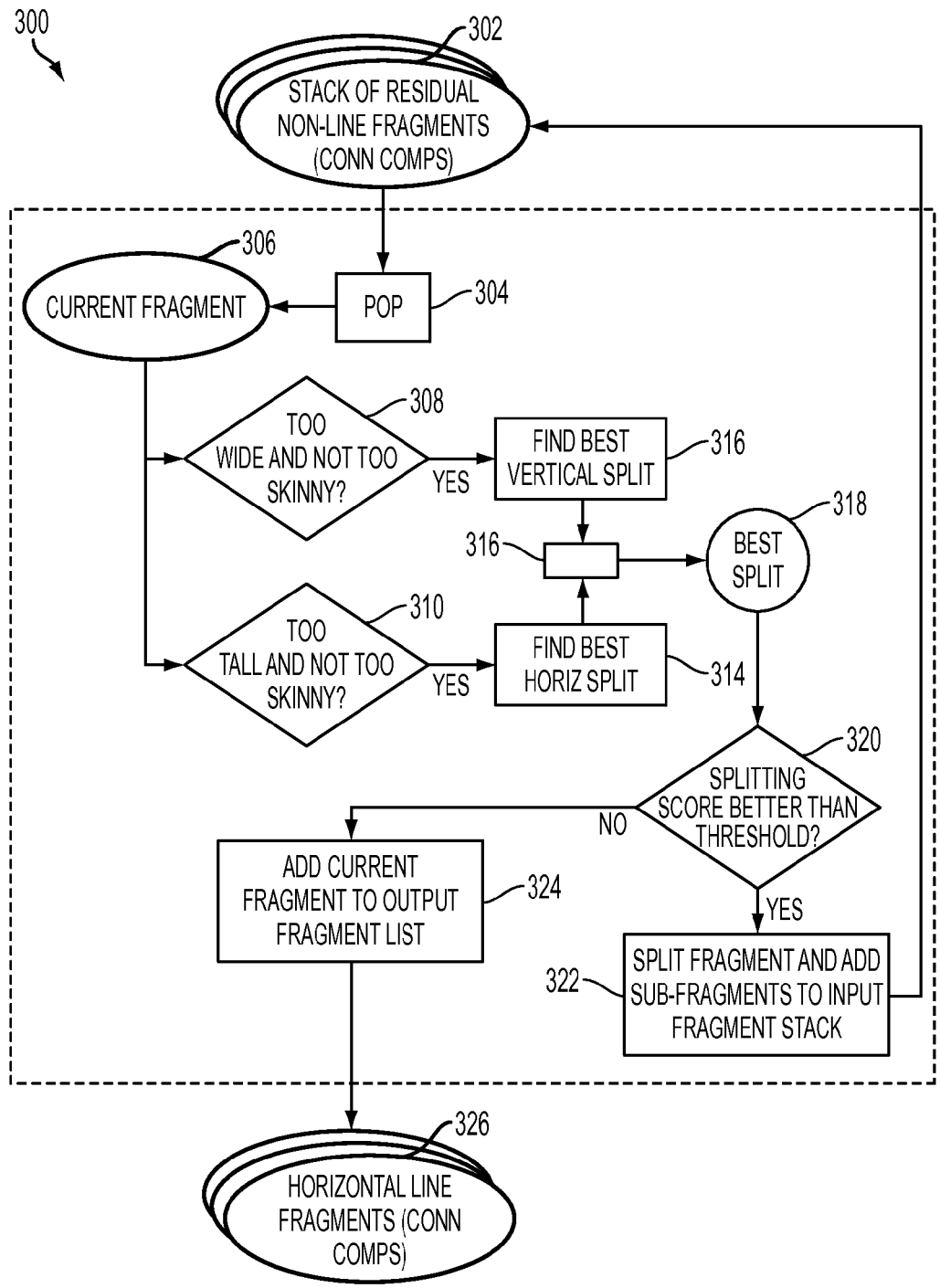
FIG. 3 is a flowchart for recursive splitting of the fragments, performed in a second stage of the segmenter.

One embodiment of segmenter 112a designed to accomplish the above is presented in FIGS. 2 and 3. FIG. 2 is a flowchart for extracting long horizontal line and vertical line fragments for a first stage or process of segmenter 112a. It is understood the decision of what is a long horizontal line or long vertical line is a set-up parameter of the systems and methods and will be affected by the particular implementation and objectives. FIG. 3 is a flowchart for recursive splitting of the fragments, during a second stage or process of segmenter 112a.

With more particular attention to FIG. 2, the extraction of long horizontal and vertical line fragment process 200 begins with image 202 being investigated to identify and separate from the remaining content of the image large horizontal runs of foreground pixels (e.g., black pixels) (step 204a) and large vertical runs of foreground pixels (e.g., black pixels) (step 204b). Thereafter, in each of the horizontal and vertical directions the long runs are marked and connection components of only the pixels of the long horizontal runs and vertical runs are formed (step 206a and step 206b). It is noted the connection components of the horizontal run and the connection components of the vertical runs are formed separately from each other as shown in FIG. 2. However, it is understood that some long foreground (black) pixel runs are accidentally found in dark regions (e.g., machine print graphic, or shadows) and in the middle of handwriting (see FIGS. 4A and 4B for illustration.). Therefore the fragments (i.e., the horizontal and vertical runs with formed connection components) are considered tentative line fragments. From this group the process removes connection components when a fraction of edge contour pixels of a predetermined size abut black pixels in the original image (step 208a and step 208b). The remaining fragments are then rendered (step 210a and step 210b) into horizontal and vertical line images (step 212a and step 212b).

Returning to image 202, in step 214 foreground pixels from the original image that are foreground pixels in the horizontal and vertical lines images are detected and removed by morphological operations to obtain "no lines" image 216. Fragments are obtained by connected components analysis of this "no lines" image (step 218). Of these fragments, any that are of a predetermined sufficiently small size and share a significant boundary with a lines image (e.g., horizontal or vertical), are removed from the "no lines" fragment list and added to the appropriate lines image (step 220a and step 220b).

At this point the tentative horizontal lines image (step 212a) and the tentative vertical lines image (step 212b) are provided to a rendering operation (step 222a and step 222b), along with fragments from steps 220a and 220b.

The rendering (step 222a and step 222b) generates respective final horizontal lines image (step 224a) and final vertical lines image (step 224b). Finally, three outputs are generated identifying: horizontal line fragments (step 226a), vertical line fragments (step 226b) and non-line fragments (step 228).

As will be discussed in more detail with regard to FIG. 3, no-lines fragments are processed through a recursive splitting routine 300 to split fragments that are initially considered to be too big to arrive at the final segmentation result. Horizontal and Vertical lines fragments are not split any further, and are added to the results.

In recursive splitting routine 300 any component fragment that is small enough is not split further. For any fragment that fails a size test, the vertical and/or horizontal split path is identified. A vertical split path is an array of x-locations for each y in the bounding box of the fragment, each x being within ±1 of its neighbors. Thus, a vertical path need not be strictly vertical. If the foreground pixels at those locations are removed, the images on the left and right of the path will be disconnected, and new smaller fragments will be obtained. Note that a single split may give rise to more than two fragments. A horizontal split path is, similarly, an array of y-locations for every x. Also, similar to the vertical path, the horizontal path does not need to be strictly horizontal.

For each pixel in an image, a cost of splitting through that pixel is assigned. For example, the cost of splitting horizontally through a black is positive and proportional to the horizontal black run length at that location. There is an incentive (negative cost) for splitting along a background pixel on the edge. This cost is set to be proportional to the response of a horizontal (vertical) edge filter for horizontal (vertical) splits. The cost of splitting through background pixels far from any edge is zero. The "best" split is defined as one where the cumulative cost along the split-path, divided by path-length, is lowest. The best path in each direction is found using a dynamic programming algorithm. Recursive splitting process 300 follows the concepts set out by Breuel in "Segmentation of Handprinted Letter Strings Using a Dynamic Programming Algorithm," in *Proceedings of Sixth International Conference on Document Analysis and Recognition*, incorporated herein in its entirety, which employs an algorithm for generating segmentation hypotheses for handwritten characters. A distinction of the present second stage of the segmenter is that while only vertical splits need to be explored for segmenting handwritten words, in the present implementation it is necessary to explore both vertical and horizontal splits, and choose between them.

Now with specific attention to the recursive splitting algorithm 300 of FIG. 3, residual non-line fragments (with connection components) are located in a memory storage stack (step 302). The stored non-line fragments are popped off of the stack (step 304), and that current non-line fragment (step 306) is passed for operation. Initially, an investigation is made as to whether the current non-line fragment is too wide and not too skinny (step 308), and at the same time, whether it is too tall, and not too skinny (step 310). If the answer to either of these inquiries is positive (yes), the process looks to find a best vertical split value (step 312), and best horizontal split value (step 314). These best values are then compared in step 316, and a best split option is generated (step 318). This best split option is provided to a decision block (step 320) to determine whether the splitting score is better than a predetermined threshold, and when the split fragment is better than the threshold (Y), the process determines the split non-line fragment (or any previously split fragment—i.e., sub-fragment) is still too large and the non-line fragment is added back to the fragment stack (step 322), for additional splitting. Alternatively, if at step 320 the best split is less than the threshold, the current fragment is added to the output fragment list (step 324), which in this example is then passed to the horizontal line fragment image (step 326). Of course when the vertical split is better the current output fragment is passed to the vertical line fragment image.

Thus, any fragment that comes as input to the recursive splitting algorithm 300 is tested to see if it should be split further. If not, it is added to the result list of fragments. If it is to be split (horizontally, or vertically, or both) the best splits are found, and if the best split score satisfies an acceptance threshold, the fragment is split recursively by collecting connected components on either side of the split path. The size of the fragments can be smaller than an individual word, smaller than an individual letter or word, or some other appropriate size depending on the implementation.

Figure 4A:
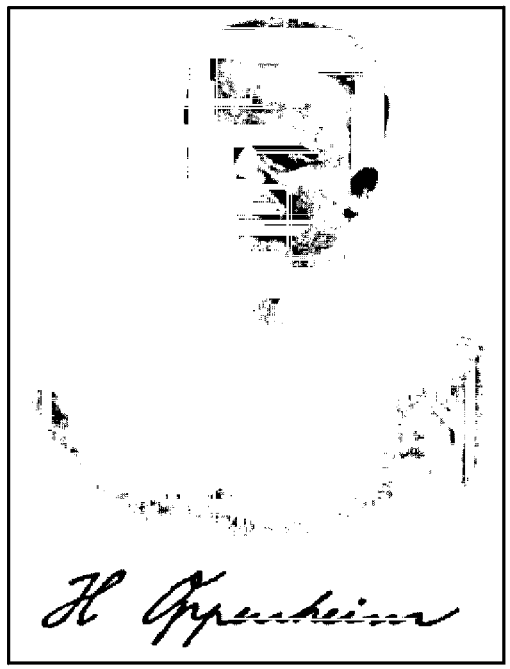
FIGS. 4A and 4B depict images wherein long runs of pixels are removed accidentally in FIG. 4A, and those pixel lines are shown in the image based on a two-stage process for removing only those long runs that have sufficient supporting edges.
Figure 4B:
Figure 6A:
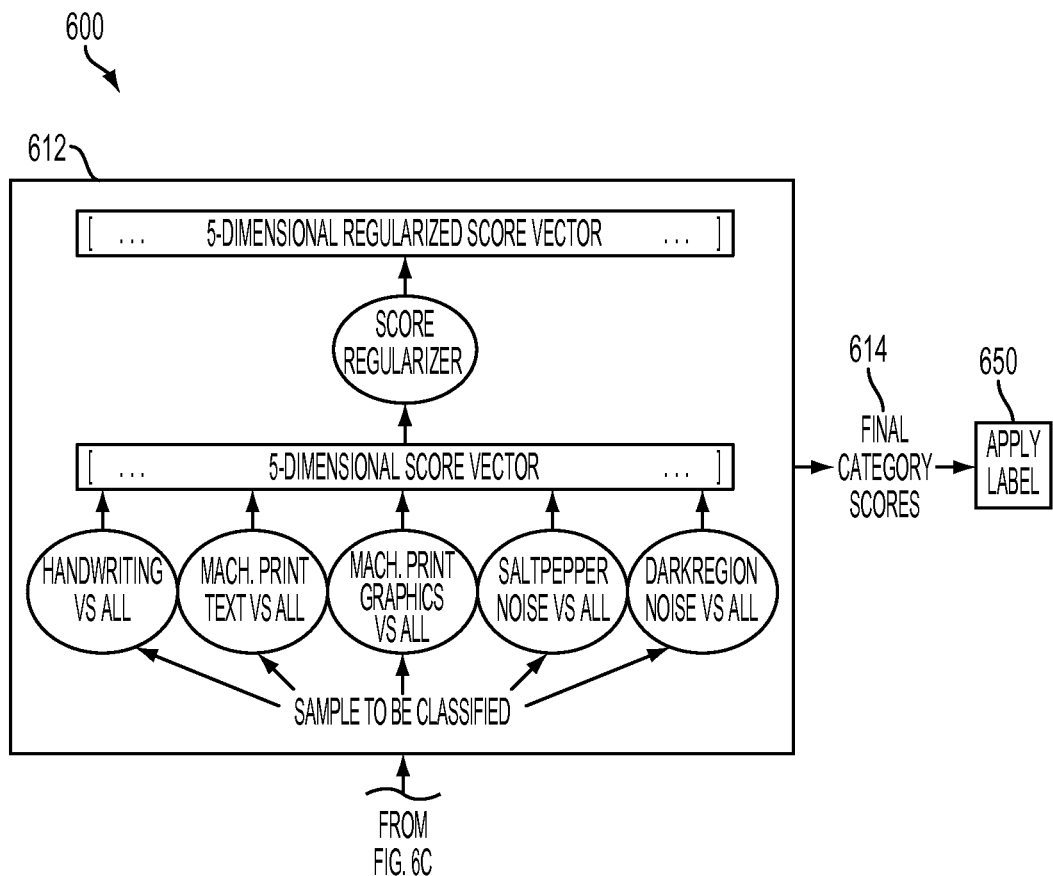
FIG. 6 is an outline of a two-stage classifier configured in accordance with the concepts of the present application.
Figure 6B:
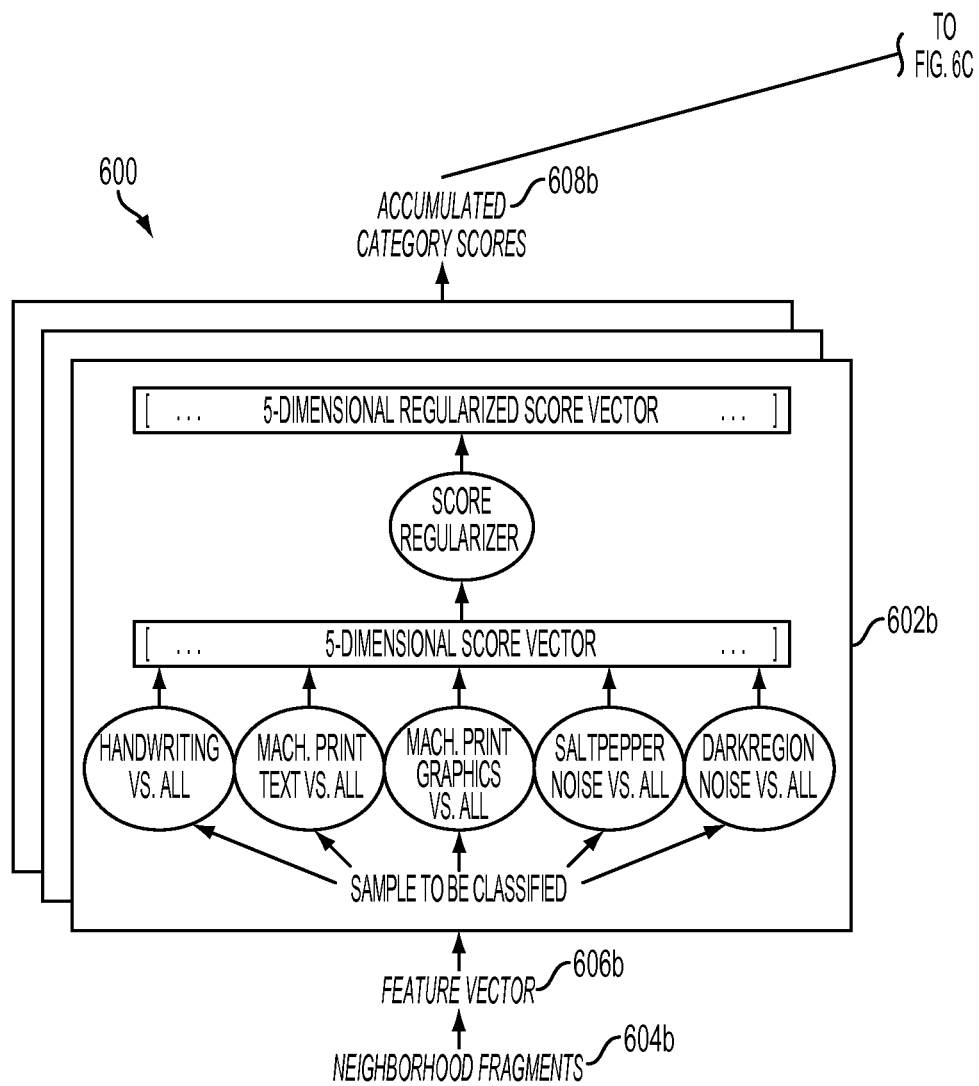
Figure 6C:
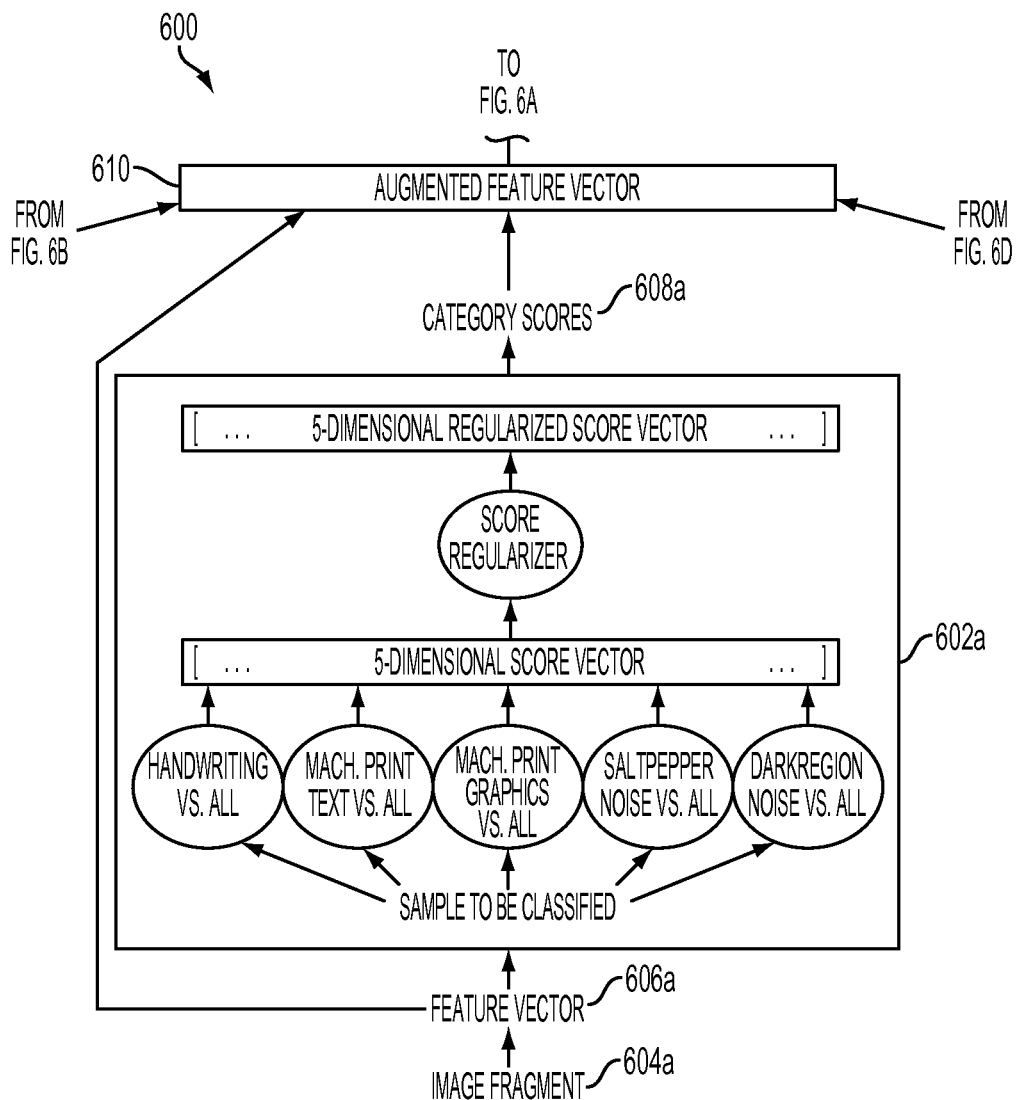
Figure 6D:
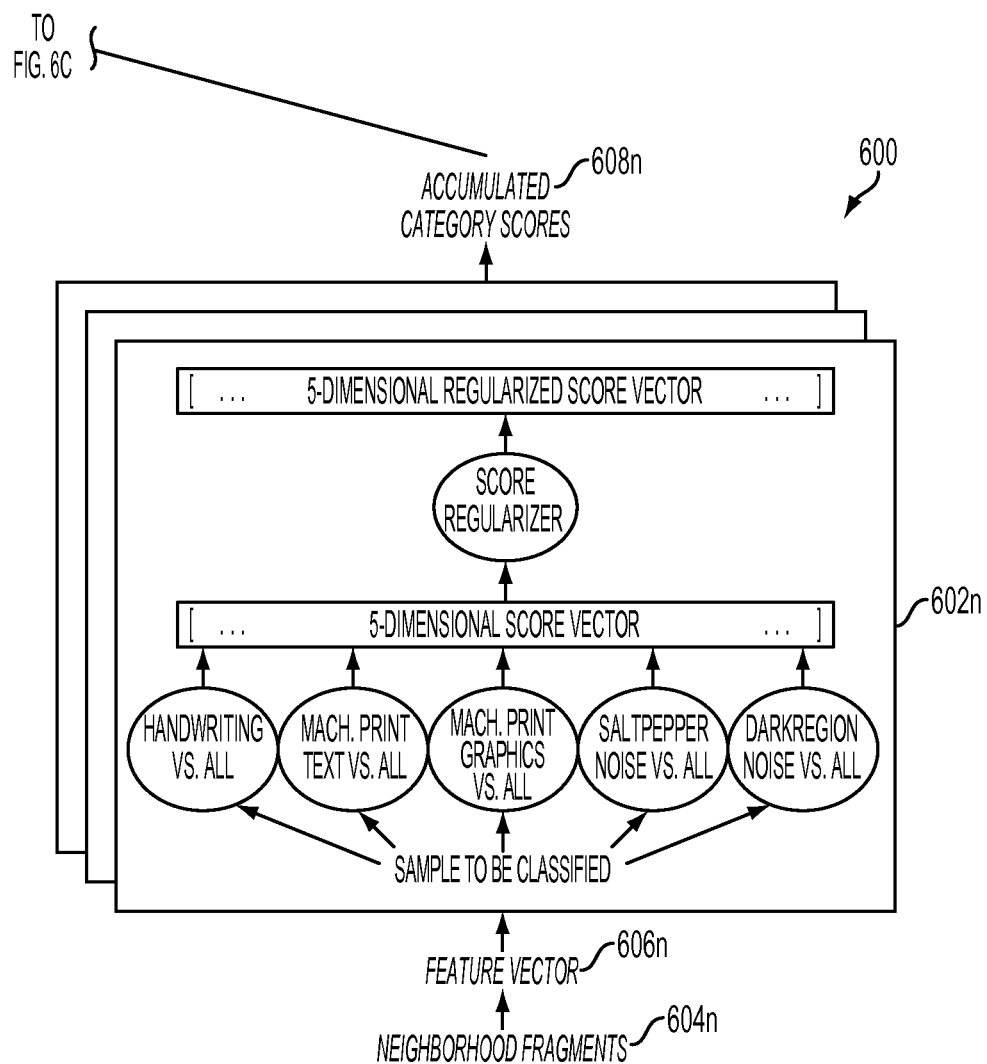

Turning now to FIGS. 4A and 4B, as previously mentioned some long foreground (black) pixel runs are accidentally found in dark regions (e.g., machine print graphic, or shadows) and in the middle of handwriting. Therefore the fragments (i.e., the horizontal and vertical runs with formed connection components) are considered tentative line fragments. This is shown with such lines removed from FIG. 4A. However, as these lines would be considered appropriate and not noise, etc., the present systems and methods more properly identify these lines. Therefore the present embodiments employ a two stage process so only those long runs that have sufficient supporting edges are actually removed.

Turning now to FIGS. 5A-5D illustrated are examples of the results of some different kinds of fragments during and after splitting. More particularly, FIG. 5A illustrates a magnified section of a portion of an image 500, including mixed content. The mixed content includes at least handwritten material 502, machine printed text 504, machine printed graphics 506, as well as what may be identified as long horizontal line runs 508. In FIG. 5B, the long horizontal line runs have been detected and extracted. As seen in this figure, the left portion of the lower horizontal line run 508 may have identified a portion of what may alternatively identified as machine-printed graphic portion (i.e., Part II) block. FIG. 5C depicts the no-line image generated by the present methods and systems, and which will be expanded upon in the following paragraphs. There are no vertical lines in this image segment. FIG. 5D shows the image segment once fragments have been generated by recursive splitting operations. In this image, the recursive splitting is a one-level-deep operation. In other words, once split, the fragments are of a small enough size and do not need to be re-split. The split paths, which are color coded (e.g., blue) in color versions of this image and identified herein in one example as split path 510. The fragment boundary contours are drawn along the outer periphery of particular fragments identifying the fragments, and in the color version of this document are also in color (e.g., red), but identified here as dotted lines fragment boundary contours 512. It is to be understood only a few of the representative identification of the split paths 510 and fragment boundary contours 512 are illustrated for clarity.

3. Fragment Classifier

As discussed above, segmenter 112*a* generates, for an image, a list of fragments. Each fragment is characterized by a number of feature measurements that are computed on the fragment and surrounding context. The classifier of the present application is trained to classify each fragment into one of the categories of the described marking types, on the basis of these features.

3.1 Features

Various kinds of features are measured on each fragment, a sampling of these include:

i. Segmenter features: These are simply two features that are either zero or one, indicating whether the fragment was part of horizontal lines and vertical lines images respectively.

ii. Size features: These include width, height, aspect ratio of the bounding boxes, the size of the perimeter, the number of holes in the connected component, the number of foreground pixels. Also included are the number of spine-fragments resulting from midcrack thinning, the ratio of foreground count to bounding box area, the ratio of foreground count to the perimeter size, and perimeter size to the bounding box area.

iii. Location features: The minimum horizontal and vertical distances of the fragment from the image boundary are measured. The idea is that this can help to tell shadow noise from dark graphic regions in the document.

iv. Regularity features: This is mainly targeted at characterizing machine printed text apart from other kinds of markings. Printed text shows a high degree of regularity of alignment and of size. If many other fragments in the document or within a spatial neighborhood share the same height, bounding box top y, and bounding box bottom y, it indicates that the current fragment is likely to be printed text or graphics. It is more accidental for handwriting or noise to show such regularity. The feature measurements are made as histograms of relative differences. For example, for the measuring height regularity, histograms of (hi−h0) are designed, where hi is the height of the $i^{th}$ fragment and h0 is the height of this fragment. The histogram bins are set to [−32, −16), ..., [−4, −2), [−2, −1), [−1, 0), [0, 0], (0, 1], (1, 2], (2, 4], ..., (16, 32].

Thus it would be expected the three middle bins would have high counts for printed text. The height histograms consider all fragments in the image, while the bounding box extremity histograms only consider fragments in an x-neighborhood.

v. Edge Curvature features: For each fragment this attempts to characterize the curvature of the outer contour through quick measurements. The curvature index at a contour point is measured as the Euclidean distance of that point from the straight line joining two other contour points that are a fixed contour distance (16 contour points) away from this point. The histogram of all curvature indices measured over a fragment's outer contour is computed and used.

vi. Contour features: This consists of two measurements. Traversing counter-clockwise around the outer contour of a fragment, the histogram of the displacement between two contour points separated by four contour positions is recorded. From here the histogram of unsigned edge displacements (where two opposite displacements get added), and histogram of symmetry violations (where two opposite displacements cancel each other) are then measured. The expectation is to see higher histogram strength around vertical and horizontal directions for printed lines and printed text. For uniform strokes it is expected low values for symmetry violations will be seen.

vii. Run length features: Spines of fragments are computed by a mid-crack thinning algorithm, such as disclosed in U.S. Pat. No. 6,377,710, to Saund, entitled, "Method And Apparatus For Extracting The Skeleton Of A Binary Figure By Contour-Based Erosion", 2002, incorporated herein in its entirety. At each point on the spine the minimum and maximum of the horizontal and vertical run-lengths are recorded. The histograms of these two numbers are returned as run-length features. Printed parts are expected to have more concentrated run-length histograms than handwriting or noise. But the concentration need not be uni-modal. The raw-run length histograms as features are used, assuming that the classifier trainer will be able to pick out some differences among the histograms for different categories.

viii. Edge-turn histogram features: These were found to be useful, but have been superseded by contour features, and edge curvature features.

ix. Textline alignment features: Crest and bottom points of the outer contours of fragments are collected, and a RANSAC algorithm is used to find groups of crests, and groups of bottoms that align very well in near horizontal straight lines. For each fragment the number of crest-alignments, and the number of bottom alignments are measured as features. These are expected to be high for printed text-lines. The third feature is obtained through further processing. The line segments from the two kinds of aligned point groups are then matched and grouped to form "textlines", under assumptions of Latin script printed text. If fragments participate in textline alignments or are completely included in textline bounding boxes, they are marked with a 1 as a strong indicator of printed text fragment. Non-participating fragments are marked with a zero. Therefore in one embodiment the classifying is to detect printed text fragments, wherein one source of evidence of the marking as printed text fragments is the degree of alignment observed between crests and bottoms of a fragment and those of the fragments neighbors. The textline concept is discussed in commonly assigned U.S. Publication No. 2011-0007970A1, to Saund, entitled, "System And Method For Segmenting Text Lines In Documents".

3.2 Classifier

Figure 7:
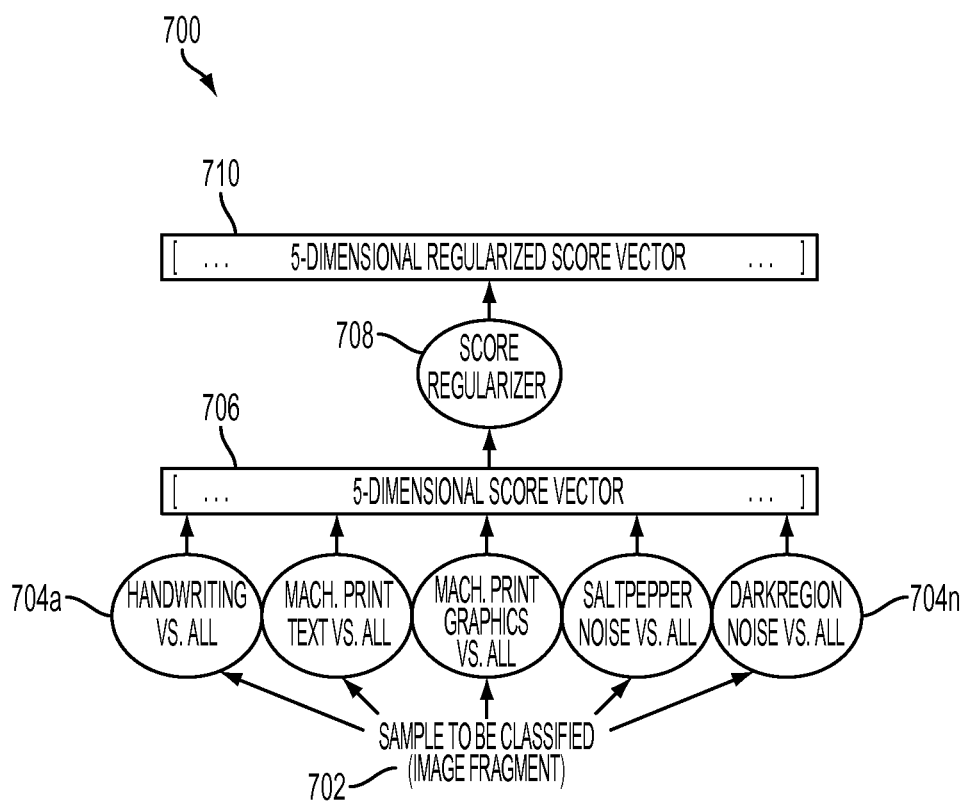
FIG. 7 shows one embodiment of a classifier which may be used in configuring the two-stage classifier of FIG. 6.

The classification of fragments according to marking type takes place in two stages, as illustrated in FIGS. 6 and 7. As more particularly shown in FIG. 6, a two-stage classifier 600 includes in its first stage 602, a plurality of first stage classifiers 602*a*, 602*b* . . . 602*n*. In the first stage, each fragment is classified solely on the basis of features described above in Section 3.1. This results in each fragment having a per-category score. So in the case of FIG. 6, image fragments 604*a* are supplied to particular feature vectors 606*a* (as will be shown in more detail in FIG. 7). If the classifier 600 stopped here the category with the highest score could be assigned for each fragment.

But as can be seen by the use of classifiers 602a and 602n, in embodiments of the present application, the classification is refined by taking into consideration the surrounding context, and how the spatial neighbors are classified. Wherein neighborhood fragments 604b . . . 604n are provided to corresponding feature vectors 606b . . . 606n. The results of these operations in the form of category scores 608a, and accumulated category scores 608b . . . 608n are supplied, along with the feature vector 602a, to an augmented feature vector 610, for use by second stage classifier 612 of the two stage classifier 600, to provide this refined output by reclassifying the image fragments 604a by taking into consideration all the features used in the first stage 602a, and also the likely category (secondary feature) labels of neighborhood fragments 604b . . . 604n. The output from the second stage classifier 612 providing final category scores 614. The final category score from classifier 612 is then used by the systems and methods of the present application to apply a label (such as a color, a grey tone, or other marking or indicator) to the segment of the image by a labeling module 650. In one embodiment, labeling module is understood to be the appropriate components of the system described in FIG. 1

The discussed secondary features are named and measured as accumulations of first-stage category-scores of all fragments with bounding boxes contained in the following spatial neighborhoods of the fragment's bounding box:
 i. Horizontal Strip: Within ±16 pixels of fragment in y, and ±160 pixels of the fragment in x.
 ii. Vertical Strip: Within ±16 pixels of fragment in x, and ±160 pixels of the fragment in y.
 iii. Rectangular Neighborhood: Within ±160 pixels of fragment in both x and y directions.

The neighborhood sizes are fairly arbitrary except in certain embodiments they are chosen to be less than one character height (e.g., 16 pixels) and several character heights (e.g., 160 pixels) based on 300 dpi, 12 point font. They can be adjusted according to application context, e.g., scan resolution. Thus the present methods and systems are tunable to particular implementations.

It is mentioned there is a subtle but important difference of purpose between the secondary features and first-stage features that also consider neighborhood content (e.g., regularity features). The secondary features establish a relationship among category-labels of neighborhood fragments, while the first-stage features measure relationships among fragments and their observable properties. Consider, for example, the regularity features. The height-regularity feature measures how frequent the fragment height is in the neighborhood. This takes into account the other fragments in the neighborhood, but not what the likely categories of these fragments are. Thus, if $s_i$ represents the $i^{th}$ fragment, $u_i$ are the features measured on that fragment, and $c_i$ is that fragments category, then the classifier trained on the first stage features establishes:

$$p(c_i|u_j; j \in \text{neighborhood}(i)).$$

In contrast, the secondary features enable a dependancy of the form:

$$p(c_i|c_j; j \in \text{neighborhood}(i)).$$

Thus the secondary features address the issue of inter-label dependence.

Zheng et al. constructed a Markov Random Field to address this issue. The present approach is different. Here a neighborhood for each node (fragment) is defined, and the fragment label is allowed to depend on the neighborhood labels. The pattern of dependence is guided by the choice of neighborhoods, but a preconceived form of dependence is not enforced. Rather the dependence, if significant, is learned from training data; the neighborhood features are made available to the second stage classifier learner and are selected if they are found useful for classification. Further, this formulation sidesteps loopy message propagation or iterative sampling inference which may have compute-time and convergence problems.

The two stage classifier is constructed by using the basic classifier explained in FIG. 7. In the first stage 602a . . . 602n the basic classifier is applied to categorize fragments based on features described above in Section 3.1. The results of categorization are aggregated for the whole image into the secondary features 608a . . . 608n. These secondary features and the initial features (606a) are together used by another basic classifier (i.e., second stage classifier 610) in the second stage to arrive at the final categorization numbers.

3.3 The Basic Classifier

In one embodiment the basic classifier used in each stage is a collection of one vs. all classifiers—one per category. This classifier type takes as input a vector of features, and produces an array of scores—one per category. This output array is then used to pick the best scoring category, or apply various rejection/acceptance thresholds.

With continuing attention to FIG. 7, classifier 700 may be understood as the type of classifier employed for each of the classifiers of FIG. 6. In this embodiment, classifier 700 is implemented as one vs. all type classifier implemented as weighted sum of weak classifiers, where each weak classifier is a single threshold test on one of scalar features measured on a fragment (e.g., one dimension of the feature vector). More particularly, an image fragment 702 is supplied to each of the feature vectors 704a . . . 704n. Output from these vectors are passed to a multi-dimensional score vector (e.g., 5-dimensional score vector) 706. This output is then passed to a score regulator 708, which provides its output to a multi-dimensional regularized score vector (e.g., 5-dimensional regularized score vector) 710.

This design set up permits extremely fast classification. For example in a classifier with a combination of 50 weak classifiers amounts to about 50 comparisons, multiplications, and additions for each fragment.

Each weak classifier produces a number that is either +1 or −1 indicating the result of the comparison test. The weighted sum of these is then a number between +1 and −1, nominally indicating positive classification if the result is positive. The output of the basic classifier is then an array of numbers, one per category. A positive result nominally indicates a good match to the corresponding category. Typically, but not always, only one of these numbers will be positive. When more than one number is positive, the fragment may be rejected as un-assignable, or the system may be designed to pick the highest scorer. Similarly, it may be necessary to arbitrate when no category returns a positive score to claim a fragment. One strategy is to feed the category-score vector to another classifier, which then produces refined category scores. This is especially useful if this second stage classifier can also be learned automatically from data. The second classifier stage which, in some embodiments has adapted this approach may be thought of as a score regularizer.

Thus the basic classifier itself may be thought of as a two stage classifier, with a number of one-vs.-all classifiers feeding into a score regularizer. This is not to be confused with the larger two stage approach where neighborhood information is integrated at the second stage. In fact, as previously mentioned, the two stage classifier is implemented by using this same basic classifier structure, but with different parameters because the second stage classifier works on an augmented feature. Therefore, preliminary category assignments are revised based on statistics of category assignments made to neighboring fragments.

Figure 8:
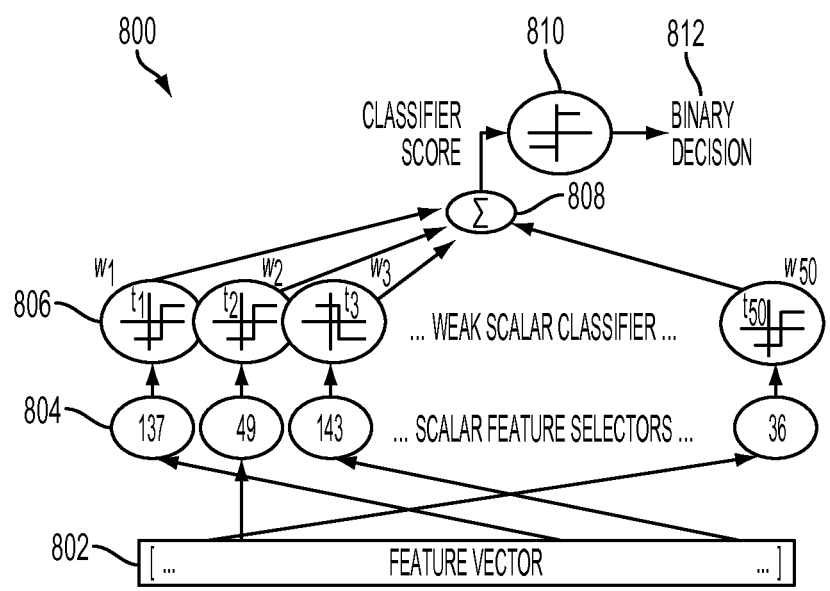
FIG. 8 is a schematic of a weighted sum classifier that is obtained by Adaboost used for each one-verse-all classifiers in one embodiment.

As depicted in FIG. 8 the basic one-vs.-all classifiers, and the score regularizer 800 may in one embodiment be trained using the machine learning algorithm Adaptive Boosting (i.e., Adaboost). In FIG. 8, a feature vector 802 is provided to scalar feature selectors 804a . . . 804n, which provide their output to weak scalar classifiers 806a . . . 806n. The material is summed at summer 808 and scored 810 to obtain a binary decision 812. In operation both, the weak-learner considers one feature dimension/vector 802 at a time, and finds the threshold test (scalar feature selectors) 804 that minimizes the weighted error on the training data (weak scalar classifier) 806. The most discriminative of these feature dimensions is then picked as the next weak classifier (808, 810, 812). This process is then repeated through Adaboost iterations. By this construction parameters of the classifier are obtained by discriminative Adaboost training that selects useful features from among a family of hundreds of measurements and assigns relative weights to the features.

This particular form of Adaboosting classifier learners has recently been found to be very effective in categorizing document images on a few Xerox Global Services client application data sets. A discussion of Adaboost is set out in Freund et al., "A Decision-Theoretic Generalization Of On-Line Learning And An Application To Boosting," in *European Conference On Computational Learning Theory*, pages 23-37, 1995, hereby incorporated herein by reference in its entirety.

4. Implementation

As mentioned, the present systems and methods employ training to accomplish such training groundtruth marking are used. It is necessary to generate these groundtruths to assist a learning and pixel-labeler system has been implemented in Java. Using this labeler, a team of volunteers manually labeled nearly 70 document images from various sources including the British American Tobacco litigation documents, NIST special database of hand-filled tax forms, among other documents. The manual labeling was done with a labeler such as described in the commonly assigned U.S. Publication No. 2011-007964A1, to Saund et al., entitled, "System and Method for Machine-Assisted Human Labeling of Pixels in an Image".

Software embodying the labeler is accessed through one main class (called from a shell script for all our experiments), which allows for three actions: train, test, and eval (i.e., evaluate). The appropriate parameters (e.g., file-names, requested actions, etc.) are specified on the command-line.

The training action requires groundtruthed images for training, a classifier name, and generates a classifier-file by that name. This classifier file is an XML serialization of the classifier object, and can be read back by the program during testing. The test action requires the name of the classifier, names of test images, and an output directory where color-indexed pixel label images are written. Finally, the eval action requires the location of groundtruthed test images, the output directory where results were written during testing, and produces a confusion matrix and several performance metrics. Currently, a per image confusion matrix is also computed and written to file during evaluation.

5. Evaluation

As mentioned, embodiments of the methods and systems of the present application were trained and evaluated on a set of scanned document images that include:
 i. Hand-Filled tax forms from the NIST special database.
 ii. Pages from machine printed journals.
 iii. Handwritten letters (some on printed letterheads) from a Xerox Global Services client.
 iv. Pages from documents used in litigation against the British American Tobacco company with hand-marked annotations and signatures on them.

Below is a discussion of results for a method and system that was trained on 16 of these images and evaluated on the rest. The 16 training documents were chosen in the following manner. Thirteen (13) images that were groundtruthed by one person were initially used for training. When the remaining documents were tested, a few documents showed very high error rates. On examination, it was found that these documents had characteristics of printed text and noise that was not represented in the training set. Three of these documents were added to the training set. This induced a marked reduction in test set error rates (from nearly 14% to nearly 10% in terms of pixel counts.)

5.1 Overall Results

Figures 9, 10:
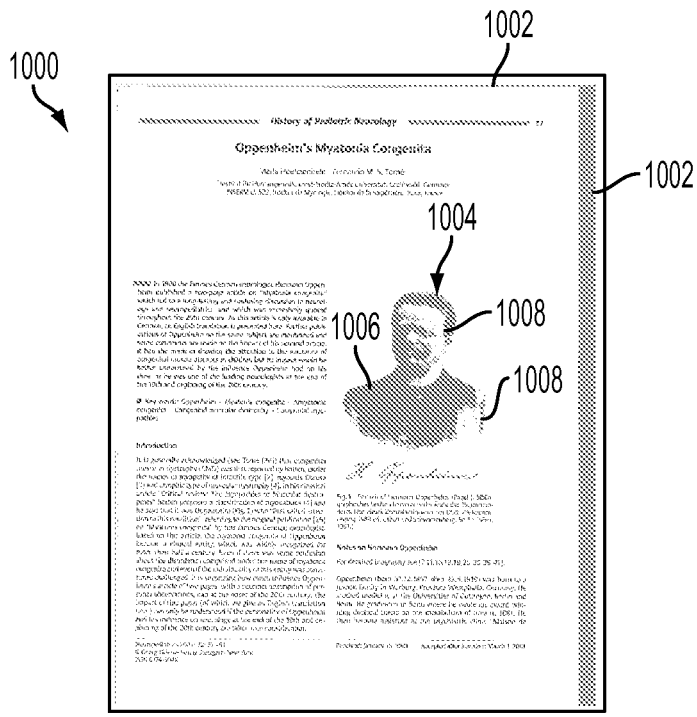
FIG. 9 depicts a pixel confusion matrix used to analyze errors on test data.
FIG. 10 is a document including machine text and a portrait with a signature, the figure identifies properly and improperly identified regions.

The confusion matrix summary of classification performance is shown in FIG. 9. The pixel counts are accumulated over all test images. The numbers are in thousand (rounded off to the nearest thousand). The numbers along the diagonals report correct classifications. Off diagonal numbers correspond to errors. The overall confusion (error) rate among the categories is 10.86%. The error rate is defined as the percentage of pixels for which the true label differs from the automatically assigned label.

Precision and recall for each category is measured. For any category label, the recall for that category is the fraction of pixels with that true label, that were also assigned the same label. The precision is defined for every assigned category. It is the fraction of the pixels with the assigned category, that also truly belong to that category. So there is a recall computed for every row corresponding to a true label, and a precision computed for every column corresponding to an assigned label.

These precision, and recall numbers can be traded off against each other by suitably adjusting acceptance thresholds according to the needs of the end application.

FIG. 10 is a document image 1000 with little or no handwriting. The document was scanned at 300 dpi resolution, and has substantial parts of "shadow" noise 1002 which was properly identified. The portrait 1004 in document 1000 shows regions that are correctly identified as an image portion 1006 and regions wrongly identified noise regions 1008 (i.e., they also should have been identified as an image portion). This particular type of error is difficult to distinguish. But depending on requirements and objectives, these errors are easily eliminated by employing known local majority voting schemes, or by enforcing other known smoothing constraints.

Figure 11:
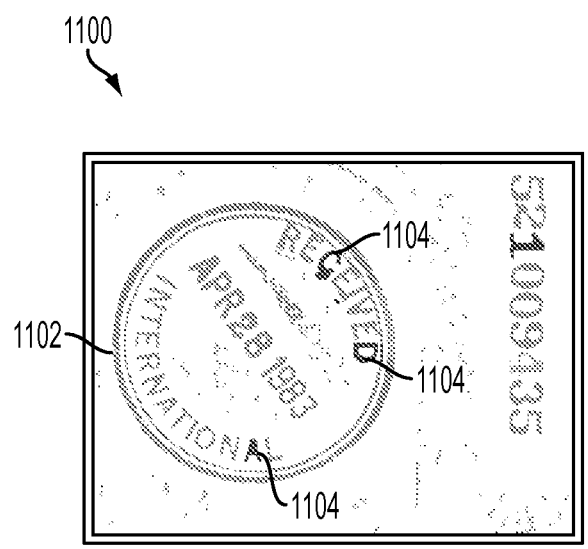
FIG. 11 is a fragment of an image including a physically applied stamp.

Turning to FIG. 11 illustrated is a portion 1100 of what may be considered a noisy document having a mixture of machine text, handwritten material, specs (noise) (all not shown) and a stamp 1102 (shown). The system of the present application successfully identified a large amount of the marking types on the document. In setting up the present system, stamps were identified in the groundtruth as machine printed text. As can be seen in FIG. 11 the system and method of this embodiment misidentified the stamp (or at least portions thereof). A reason for this mis-identification (1104, 1106) is that the training data did not have a document with a stamp. This highlights that employing a large training group improves operation of the system and method.

5.2 Timing Statistics

In terms of the algorithms implemented, classification time is directly proportional to the number of fragments generated by the segmenter. The same holds true of many of the feature extractors, although features that take into account the context of other fragments could be up to quadratic in their complexity. The core classification algorithm (once features are available) is extremely fast as previously explained.

The segmentation algorithm is complex to analyze. The most time consuming parts require time that should be linear combinations of the number of pixels, the number of foreground pixels, and the number of fragments.

It turns out empirically that segmentation is the most time consuming part in the disclosed embodiments. On the test set of images the median segmentation time is 3.8 seconds per image. In comparison, the median time required to compute features, classify fragments, and write the results of classification to file is 0.6 seconds. Most of the test are of letter-sized pages at 300 dpi. The median time, per image, for complete processing and input output is 4.6 seconds. These times are quoted from batch testing experiments that were run on penguin cluster machines. These were running 64-bit Intel Xeon processors, 2.66 GHz, with 8 GB RAM, and 4 MB on chip cache memory.

5.3 Additional Teachings

As noted from the above discussion the present embodiments have experimented with many features to characterize a fragment and its neighborhood. These experiments have provided various information to the present discrimination tasks A gain in performance is obtained by adding difficult images (i.e., noisy with mixed marking types) to the training set. This is because the learning algorithms rely on the feature distributions being stable between training and testing (application) examples. The more variety of samples it sees during training, the better the generalization.

Another gain in performance is obtained by associating higher weights with less frequent samples. In certain testing it was observed that the system was making errors on large-font machine printed text fragments, but there were very few examples of them in the associated training data. By replicating these training samples several times, it is possible to significantly reduce errors on the larger fonts. Although this may not make a significant difference in pixel error counts, it will eliminate some errors that stood out because large fonts constitute salient parts of documents.

The process of characterizing handwriting, benefits from more sophisticated models for following and characterizing strokes. The more sophisticated models are however more computationally intensive, resulting in higher time in analyzing documents. This applies to both the feature extraction and segmentation stages. Over-fragmenting of long handwritten strokes, and under-fragmenting of small marks (such as checks overlapping printed check boxes) result in evaluation errors, as well as misinformed training. The same holds for characterizing machine-printed block graphic, stamp-marks, and other such markings if there are not enough examples to train on.

It has been determined that bad segmentation leads to bad classification, but often how the markings/images are segmented is informed by the understanding of marking types. Ideally segmentation and type classification should proceed substantially in lock step informing each other.

The above discussion has disclosed a strong marking type recognizer, additional aspects to such a marking type recognizer are discussed below.

i. Target application: A motivation for the disclosed subject matter included the use as a detector for annotated page images, with a capability to perform mark-type classification. The system performance can be targeted effectively to use specific use-cases to achieve higher accuracy performance. This works in three ways:

Within a particular use context, the data can be expected to be less variable that in the large. This includes image resolution, text and noise characteristics, as well as relative frequencies and spatial arrangements.

The deduction of category labels from category scores can be and should be tuned to the particular application in hand. For example, if the goal is to identify printed text regions on a page, standard methods to associate small neighboring fragments with printed characters can be applied to "clean up" the results. In one embodiment this would be in lieu of the generic secondary feature evaluation. There may also be a tradeoff among relevant and irrelevant confusions by suitably biasing the category scores.

Finally, the "soft" classification scores can be aggregated to arrive at higher level decisions, e.g., if a specified region on the page is mainly handwriting.

ii. Learning in segmentation: Improving the segmentation of images contributes to accuracy at a pixel level. As discussed, while under-segmentation is sure to cause pixel errors, over-segmentation can make the learning task harder. There are at least two places where learning can help improve segmentation: (a) identifying which fragments need further splitting, and (b) the split-through scores in the image.

iii. Using better weak classifier learners: Allowing for pairs or triples of features to participate in weak classifiers in the boosting process is understood to improve the efficiency of learning classification.

iv. More sophisticated features: Although the current experience is that more variety in training data seems to be the prime driver of performance improvement, more sophisticated features can help improve performance. The described system accepts easy addition of more features, and/or substitution of existing features.

v. Better calibration of classifier output: The discriminative classifiers in the system do a good job of classification. But it appears that the effectiveness of the second stage of classification can be improved with better calibration of the output scores to improve their comparability. For example alternative trainers may be used such as the trainer known as RealBoost for training the classifiers.

vi. Color or gray-scale input: Clearly from the point of view of any application, color or grayscale can provide excellent evidence for segmentation, as well as classification of marks, as described in U.S. Pat. No. 6,301,386 to Zhu et al., entitled "Methods and Apparatus For Gray Image Based Text Identification", incorporated herein by reference in its entirety. The present classification framework readily supports any kind of image, fragment, and feature definition. However, the segmentation algorithm and some of our features would have to be redesigned to effectively make use of color or multi-level gray input.

Systems and methods have been described for classifying foreground pixels in binary images into different marking types. This system is trainable from data. On described test cases populated with noisy scans a level of 93-95% (where confusion between different kinds of noise is ignored) pixel labeling accuracy has been obtained when compared to human labeled data. The present embodiments segment foreground pixels into fragments, if necessary by splitting connected components formed by overlapping markings, and then classifies each of these fragments, assigning scores for each category. This is state of the art because all previously reported systems tend to classify words, textlines, or larger regions in images. Being trainable, this system is ready to be used in downstream applications, or to be retargeted to other mark classification or detection tasks.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of classifying markings on an image of a document page according to marking type, the method comprising:
   supplying the document page image to a segmenter;
   breaking the image received by the segmenter into fragments of foreground pixel structures that are identified as being likely to be of the same marking type, by finding connected components, extracting near horizontal or vertical rule lines, and splitting at least some connected components to obtain the fragments;
   supplying the fragments to a classifier, the classifier providing a category score to each fragment, wherein the classifier is trained from ground truth images whose pixels are labeled according to known marking types; and
   assigning a same label to all pixels in a fragment when the fragment is classified by the classifier.

2. The method according to claim 1 wherein the segmenting step includes a first segmenting of horizontal and vertical lines which are detected and removed by morphological operations, and a second stage of recursively splitting the connected components until a size test is passed.

3. The method according to claim 2 wherein the segmenting is based on dynamic programming, to find a lowest cost split-path that traverses the fragment to be split.

4. The method according to claim 3 wherein the cost of the split-path is a sum of pixel costs along the path.

5. The method according to claim 1 wherein the fragments are smaller than a word.

6. The method according to claim 1 wherein the fragments are smaller than an individual letter or an individual number.

7. The method according to claim 1, wherein preliminary category assignments are revised based on statistics of category assignments made to neighboring fragments.

8. The method according to claim 1 wherein parameters of the classifier are obtained by discriminative Adaboost training that selects useful features from among a family of measurements and assigns relative weights to the features.

9. The method according to claim 1 wherein the classifying detects printed text fragments, wherein one source of evidence is the degree of alignment observed between crests and bottoms of a fragment and those of the fragments neighbors.

10. A method of classifying markings on an image of a document page according to marking type, the method comprising:
    supplying the document page image to a segmenter;
    breaking the image received by the segmenter into fragments of foreground pixel structures that are identified as being likely to be of the same marking type, by finding connected components, extracting near horizontal or vertical rule lines, and splitting at least some connected components to obtain the fragments;
    supplying the fragments to a classifier, the classifier providing a category score to each fragment, wherein the classifier is trained from ground truth images whose pixels are labeled according to known marking types; and
    assigning a same label to all pixels in a fragment when the fragment is classified by the classifier, wherein the classifier is a two stage classifier, wherein in the first stage of the classifier each fragment is classified solely on the basis of features, resulting in each feature having a per category score, and the second stage classifies by taking into consideration secondary features.

11. The method according to claim 10 wherein the secondary features establish a relationship among category-labels of neighborhood fragments, while features used in the first stage of the classifier measure relationships among fragments and their observable properties.

12. A system of classifying markings on images in a document according to marking types, the system comprising:
    a segmenter operated on a processor and configured to receive the document containing the images, the segmenter breaking the images into fragments of foreground pixel structures that are identified as being likely to be of the same marking type by finding connected components, and dividing at least some connected components to obtain image fragments; and
    a classifier operated on a processor and configured to receive the fragments, the classifier providing a category score to each received fragment, wherein the classifier is trained from ground truth images whose pixels are labeled according to known marking types, the classifier assigning a same label to all pixels in a fragment when the fragment is classified by the classifier.

13. The system according to claim 12 further including a scanner to receive a hardcopy document containing images, the scanner converting the hardcopy document into an electronic document, the electronic document being the document supplied to the segmenter.

14. A system of classifying markings on images in a document according to marking types, the system comprising:
    a segmenter operated on a processor and configured to receive the document containing the images, the segmenter breaking the images into fragments of foreground pixel structures that are identified as being likely to be of the same marking type by finding connected components, and dividing at least some connected components to obtain image fragments; and
    a classifier operated on a processor and configured to receive the fragments, the classifier providing a category score to each received fragment, wherein the classifier is trained from ground truth images whose pixels are labeled according to known marking types, the classifier assigning a same label to all pixels in a fragment when the fragment is classified by the classifier, wherein the classifier is a two-stage classifier, and the first stage of the two-stage classifier operates on the fragment features and the second stage of the classifier is augmented by secondary features.

15. The system according to claim 14 wherein the first classifier stage consists of an array of one-vs-all classifiers, with one per category and produces an array of category scores between +1 and −1, and the second classifier stage is a score regularizer, which takes the category score array from the first classifier stage and produces an array of refined scores, informed by the scores of every marking type category.

16. A method of classifying markings on images in a document according to marking types, the method comprising:
   supplying the document containing the images to a segmenter;
   breaking the images received by the segmenter into fragments of foreground pixel structures that are identified as being likely to be of the same marking type by finding connected components, and dividing at least some connected components to obtain the fragments, and wherein the segmenting step includes a first segmenting of horizontal and vertical lines which are detected and removed by morphological operations, and a second stage of recursively splitting the connected components until a size test is passed;
   supplying the fragments to a two stage classifier, the two stage classifier providing a category score to each fragment, wherein the two stage classifier is trained from ground truth images whose pixels are labeled according to known marking types, wherein the first classifier stage consists of an array of one-vs-all classifiers, with one per category and produces an array of category scores between +1 and −1, and the second classifier stage is a score regularizer, which takes the category score array from the first classifier stage and produces an array of refined scores, informed by the scores of every marking type category; and
   assigning a same label to all pixels in a fragment when the fragment is classified by the classifier as a certain marking type.

17. The method according to claim 16 wherein the segmenting is based on dynamic programming, to find a lowest cost split-path that traverses the fragment to be split.

18. The method according to claim 17 wherein the cost of the split-path is a sum of pixel costs along the path.

19. The method according to claim 16 wherein the secondary features establish a relationship among category-labels of neighborhood fragments, while features used in the first stage of the classifier measure relationships among fragments and their observable properties.

* * * * *